United States Patent

Hancock et al.

[15] 3,691,415
[45] Sept. 12, 1972

[54] DRYER MOTOR SWITCH AND ACTUATOR

[72] Inventors: James L. Hancock, Fairborn; Joseph A. Bliss, Dayton, both of Ohio

[73] Assignee: General Motors Corporation, Detroit, Mich.

[22] Filed: Sept. 16, 1971

[21] Appl. No.: 181,066

[52] U.S. Cl. .................................310/68 E, 200/80
[51] Int. Cl. ..............................................H02k 11/00
[58] Field of Search ....................310/68 E; 200/80 R

[56] References Cited

UNITED STATES PATENTS

| | | |
|---|---|---|
| 2,452,807 | 11/1948 | Thompson............310/68 E X |
| 2,493,897 | 1/1950 | Petz et al......................200/80 |
| 2,568,773 | 9/1951 | Sparklin ......................200/80 |
| 2,811,656 | 10/1957 | Mollenberg..............310/68 E |

Primary Examiner—D. X. Sliney
Attorney—W. E. Finken et al.

[57] ABSTRACT

In the preferred form, this disclosure relates to a plunger actuated switch assembly for controlling energization of the start and run winding circuits of a dynamoelectric machine having a rotatable output shaft and a centrifugal governor for shifting a collar between a standstill position and a second position when the speed of the output shaft attains a predetermined value. The switch assembly includes a plunger or actuator having an elongated boot portion which rides on the annular periphery of the collar during standstill, the collar holding the switch means in a first position in which it effects energization of both the start and run windings. The switch plunger is spring biased toward a second position in which it effects energization of only the run windings and moves to its second position when the collar is shifted toward its second position.

3 Claims, 6 Drawing Figures

INVENTORS
James L. Hancock &
BY Joseph A. Bliss
W. A. Schuetz
ATTORNEY

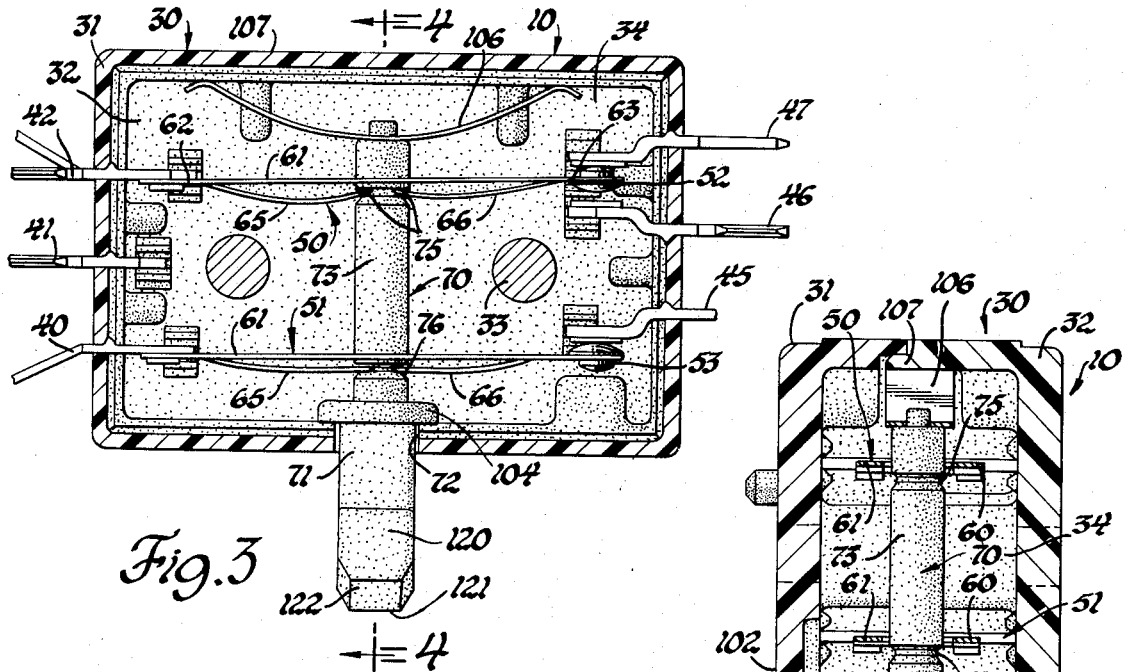
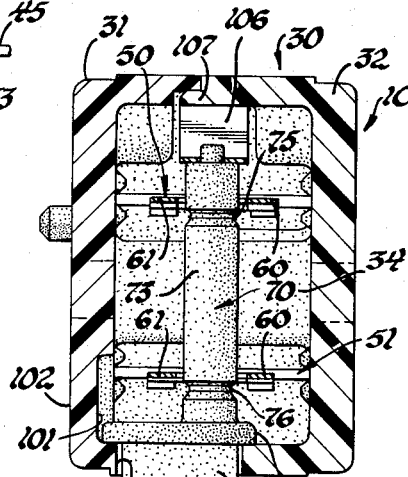
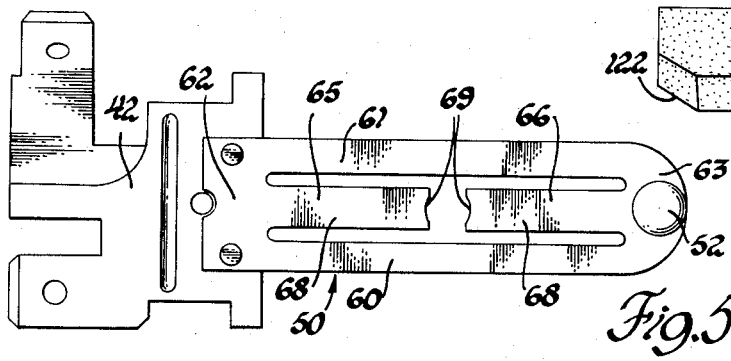
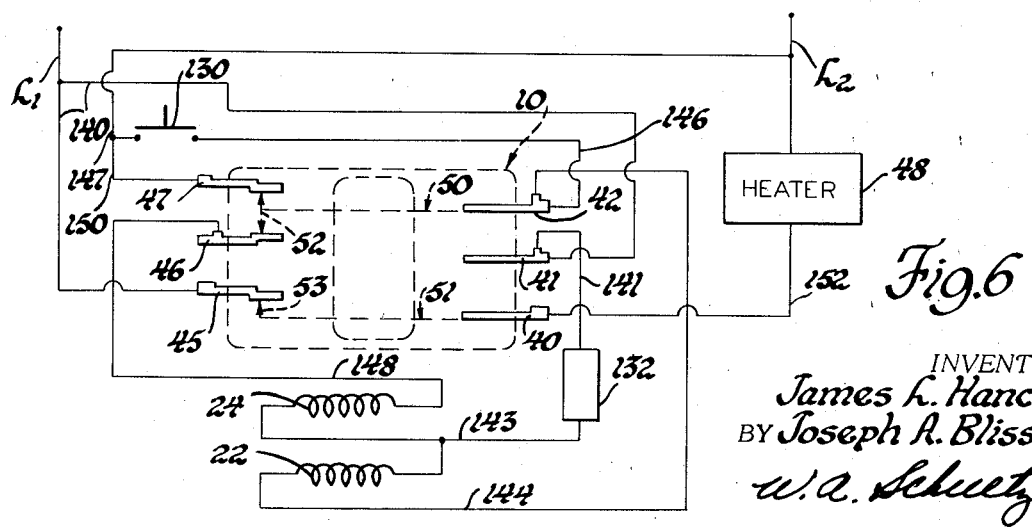

DRYER MOTOR SWITCH AND ACTUATOR

The present invention broadly relates to a switch assembly, and more particularly to a plunger actuated switch assembly for use in controlling the start and run winding circuits of a dynamoelectric machine.

In various dynamoelectric machine or electric motor applications in which a high starting torque is extremely important, such as for motors for automatic clothes dryers and other appliances, it has been customary to construct a motor with at least one main excitation or run winding and a start winding. When starting up, both the main and start windings are energized until the electric motor reaches a predetermined speed whereupon the start winding is disconnected from the power source.

It is also known to employ a plunger actuated switch assembly for controlling energization and de-energization of the start winding and a centrifugal governor mechanism for controlling operation of the switch assembly. The centrifugal governors have included a collar which is shiftable between a first position during standstill and second position when the electric motor has obtained a predetermined speed. The switch assemblies were operatively connected with the shiftable collar via spring biased levers, flexible levers, or other spring biasing means. The collar served to control movement of the levers or spring biasing means, which in turn controlled the movement of the plunger of the switch assembly.

While the above-noted arrangements have operated satisfactorily, they nevertheless have some drawbacks. The above arrangements require accurate calibration of the leaf springs or spring biased levers and/or accurate positioned of the governor mechanism relative to the levers or spring biasing means if proper operation of the switch assembly was to be effected. This calibration or accurate positioning is costly, since it increases assembly time.

Moreover, it is also desirable to use snap acting overcenter springs for moving the switch contacts of the switch assembly between its positions and for holding the switch contacts in engagement with their adjacent stationary terminals within a predetermined range of contact pressures. If the contact pressure can be maintained within a desired range for a particular switch design, the life of the switch is maximized. However, with the prior arrangements and the necessity to accurately calibrate the various spring biased levers etc. the baising pressure exerted against the switch plunger often increased the switch contact pressure above the range of pressures it was designed for. This, in turn, has resulted in a shorter overall switch life.

The present invention overcomes the above-noted difficulties and disadvantages by providing a switch assembly having a plunger which is directly and slidably engaged by the shiftable collar of the governor mechanism so that the governor mechanism does not have to be accurately positioned with respect to the plunger of the switch assembly. Moreover, the designed range of contact pressures for the overcenter switch means is not affected by the position or movement of the collar.

Accordingly, an important object of the present invention is to provide a new and improved switch assembly for controlling the start and run winding circuits of a dynamoelectric machine having a rotatable output shaft and a centrifugal governor mechanism operable to shift a collar between a first position when at standstill and a second position when the dynamoelectric machine obtains a predetermined speed, and in which the switch assembly includes a plunger or actuator having an elongated boot portion which extends axially of the shaft and rides on the annular collar during standstill and which is disengaged from the collar when the collar is shifted to its second position to effect de-energization of the start winding circuit whereby the switch assembly is actuated directly by the shiftable collar and the relative position of the annular collar and the boot portion of the plunger of the switch assembly at standstill is not critical.

Another object of the present invention is to provide new and improved switch assembly, as defined in the preceding object, and in which the switch assembly includes an enclosed housing for slidably guiding the plunger for linear movement and a snap acting overcenter spring means operatively connected with the plunger and housing for rapidly moving a mobile contact into engagement with an associated stationary terminal to energize only the run windings when the motor reached a predetermined speed and for holding the same in engagement with the stationary terminal at a predetermined pressure force, and wherein the overcenter spring means is so constructed and arranged that it increases the contact pressure when the dimensions of the mobile contact decrease due to wear.

Yet another object of the present invention is to provide a new and improved switch assembly, as defined in the next preceding object, and in which the plunger extends through an opening in the housing and includes a flange intermediate its ends which engages the inner wall of the housing to provide a seal to prevent the entry of foreign material into the housing when the plunger has been actuated to energize only the run windings.

The present invention further resides in various novel constructions and arrangement of parts, and further objects, novel characteristic and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 3 is an enlarged sectional view like that shown in FIG. 2, but showing different parts thereof in different positions;

FIG. 4 is a cross-sectional view taken approximately along line 4—4 of FIG. 3;

FIG. 5 is a plan view of part of the switch assembly shown in FIG. 2; and

FIG. 6 is a schematic wiring diagram for controlling operation of the dynamoelectric machine shown in FIG. 1.

Figure 1:
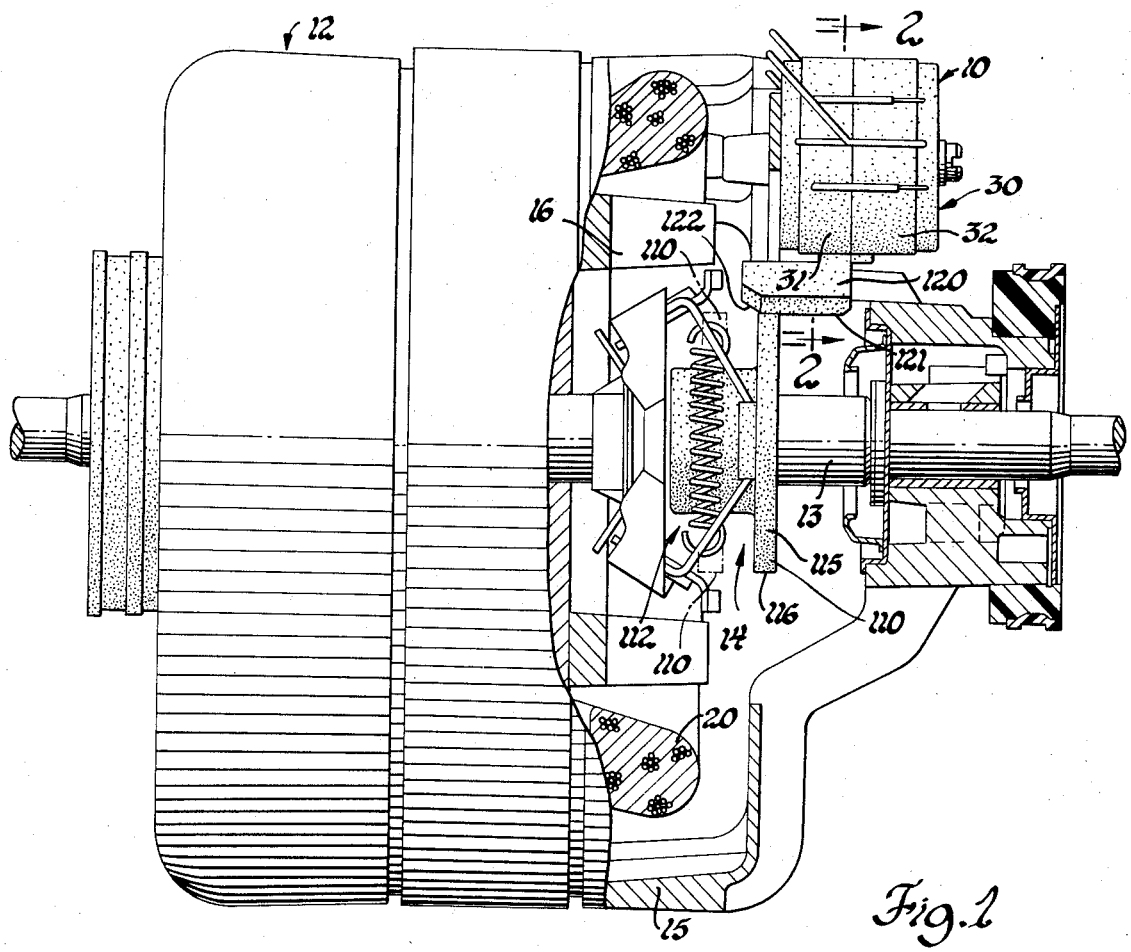
FIG. 1 is a fragmentary side elevation view, with portions shown in section, of a dynamoelectric machine embodying the novel switch assembly of the present invention.

The present invention provides a novel switch assembly 10 for controlling the start and run winding circuits of a dynamoelectric machine or electric motor 12 having a rotatably output shaft 13 and a centrifugal governor mechanism 14 for shifting a collar axially of the shaft to actuate and de-actuate the switch assembly 10. Although such a dynamoelectric machine 10 could be used in operating various device, it will herein be described as being used in a conventional clothes dryer (not shown).

The electric motor 10 could be of any suitable or conventional construction and is hereshown as being a single speed, single phase, induction type motor. The motor 12 includes a motor frame 15 for rotatably supporting an induction rotor 16 having an output shaft 13. Surrounding the rotor is a stator 20. As best shown schematically in FIG. 6, the motor includes a main field or run winding 22 and an auxiliary or starter winding 24. These windings are conventionally displaced 90 electrical degrees n the stator core and both are energized during starting conditions. When the rotor 16 and shaft 13 are brought up to a predetermined speed, the starter windings 24 are de-energized and the motor 12 is rotated solely by the main field winding 22.

The switch assembly 10 controls energization and de-energization of the run and start windings 22 and 24, respectively. The switch assembly 10 comprises a housing or housing means 30 which is generally rectangular in shape and which is suitably secured to the frame 15 of the electric motor 12. The housing 30 comprises a pair of complementary halves 31 and 32 which are adapted to be secured together via screws 33. The housing 30 defines an enclosed chamber 34.

The housing 30 at its left end wall, as viewed in FIG. 3, carries three vertically spaced stationary terminals 40, 41 and 42 and the right end wall of the housing carries three vertically spaced stationary terminals 45, 46 and 47. The stationary terminals 40 and 45 are adapted to be electrically connected in a circuit with an electric heater 48 (see FIG. 6) for the dryer (not shown). The terminal 47 is adapted to be connected in a circuit with the main winding 22 of the electric motor, the terminal 46 is adapted to be connected in the circuit with the main and start windings 22 and 24 of the electric motor 12 and the terminal 42 is connected to a suitable ground. The terminal 41 is a junction terminal. The manner in which the terminals are connected in circuit for operating the electric motor 12 and the heater 48 of the dryer will be described in more detail hereinafter.

The switch assembly 10 further includes a pair of snap acting overcenter springs 50 and 51 having one end secured to the terminals 42 and 40 and their other or free ends disposed between the terminals 46 and 47 and adjacent the terminal 45, respectively. The overcenter springs 50 and 51 carry mobile contacts 52 and 53 at their free ends, respectively. Since each of the overcenter springs 50 and 51 is of an identical construction, only the overcenter spring 50 will be described in detail, and corresponding portions of the spring 51 will be given the same reference numerals as the spring 50.

The snap acting overcenter spring means 50 comprises a one piece spring metal member, preferably made from a beryllium copper alloy material, having a pair of parallel spaced arms 60 and 61 and end portions 62 and 63 integrally connecting the adjacent ends of the arms 60 and 61. The end portion 62 is suitably secured or riveted to the stationary terminal 42. The end portion 63 carries the mobile contact 52. The overcenter spring means 50 also includes a pair of bowed leaf spring portions 65 and 66 which are respectively integral with the end portions 62 and 63 and which extend toward each other. The bowed leaf spring portions 65 and 66 are spaced from the parallel arms 60 and 61 and their adjacent ends 68 have an arcuate cut out or recess 69.

The overcenter spring means 50 is adapted to be operatively connected to a plunger or actuator 70. The actuator 70 has an intermediate portion 71 of rectangular cross section which is slidable received within a rectangularly shaped opening 72 in the bottom side housing 30. The actuator further has an upwardly extending cylindrically shaped or stem portion 73 disposed within the compartment 34 of the housing 30 and which is provided with a pair of axially spaced annular recesses 75 and 76. The recesses 75 and 76 receive the adjacent free ends 68 of the bowed leaf spring 65 and 66 of the overcenter springs 50 and 51. The leaf springs 65 and 66 are longer than the distance between their ends integral with the end portions 62 and 63 and the bottom of the recesses 75 and 76, respectively, so that they assume a bowed configuration, as shown in FIGS. 2 and 3, when received within the annular recesses 75 and 76 in the stem portion 73 of the plunger 70.

Figure 2:
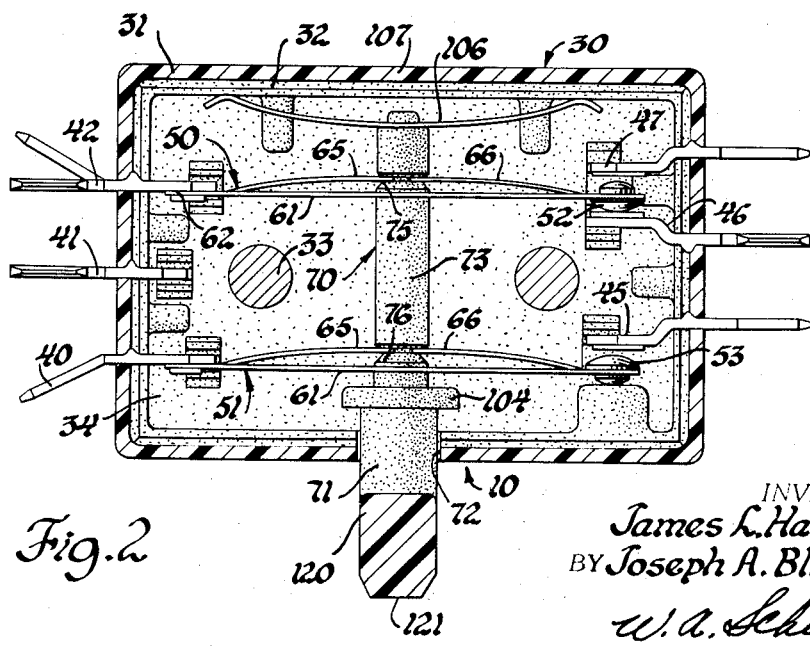
FIG. 2 is an enlarged cross-sectional view of the switch assembly taken approximately along line 2—2 of FIG. 1.

The plunger 70 is adapted to be reciprocated between first and second positions as shown in FIGS. 2 and 3, respectively. When the plunger 70 is in the position shown in FIG. 2, the mobile contact 53 of the overcenter spring means 51 is disengaged from the terminal 45 which effects de-energization of the heater 48 for the dryer and the mobile 52 contact of the overcenter spring means 50 is in engagement with the terminal 46 to effect energization of both the start and run windings 24 and 22 of the electric motor 12. When the plunger 70 has been moved to its second position, as shown in FIG. 3, the mobile contact 53 of the overcenter spring means 51 engages the terminal 45 to energize the heater 48 of the dryer and the mobile contact 52 of the overcenter spring means 50 engages the terminal 47 to effect energization of only the main field winding 22 of the motor 10.

When the plunger 70 is moved between its positions, the overcenter spring means 50 and 51 cause movement of the mobile contacts 52 and 53 into and out of engagement with their respective stationary terminals with a snap action. As can be seen from FIG. 2, when the plunger 70 is moved downwardly from its FIG. 3, the bowed leaf springs 65 and 66 of each of the overcenter spring 50 and 51 are caused to be bowed even further than that shown in FIG. 2 until the ends 68 of the bowed leaf springs 65 and 66 pass beneath the plane of the arms 60 and 61. When this occurs, the bowed leaf springs 65 and 66 will cause the arms 60 and 61 and the end portions 63 carrying the mobile contacts 52 and 53 to be moved upwardly with a snap action until the mobile contacts 52 and 53 engage the terminals 47 and 45. Likewise, when the plunger 70 is moved from its second position as shown in FIG. 3, toward its first position, as shown in FIG, 2 the bowed leaf springs 65 and 66 of each of the overcenter spring 50 and 51 are caused to bowed even further than that shown in FIG. 3 until the ends 68 thereof move upwardly past the plane of the arms 60 and 61. When this occurs, the bowed leaf springs 65 and 66 will cause the arms 60 and 61 and the end portions 63 to be moved downwardly with a snap action.

Movement of the plunger 70 between its positions is guided by a guide means comprising a rectangularly shaped recess or slot 101 in the forward end wall 102 of the housing 30 and a rectangular flange 104 intermediate the ends of the plunger 70. The flange 104 at its rearward end is received within the recess 101. The plunger 70 is also guided by the balance of forces acting on the plunger from the bowed leaf spring forces 65 and 66 of the overcenter springs 50 and 51. As a result of the flange 104 being received within the recess 101, the rectangular portion 71 being slidably received within the rectangular opening 72 and the bowed leaf springs 65 and 66, the plunger 70 is guided for linear movement up and down relative to the switch housing 30. An advantage of this guide arrangement is that it virtually eliminates or minimizes friction between the actuator and housing 30. It should also be noted that the flange 104 completely surrounds the opening 72 when the plunger is in its second position, as shown in FIG. 3, and thus, serves to provide a seal for the enclosed switch chamber 34 to prevent entry of foreign material or lint into the housing 30.

The plunger 70 is biased toward its second position, as shown in FIG. 3, by a biasing means in the form of a bowed leaf spring 106. The leaf spring 106 intermediate its ends is suitably secured to the upper end of the stem portion 73 of the plunger 70 and at its opposite ends is slidably engaged with the upper side wall 107 of the housing 30. The biasing force of the bowed leaf spring 106 is greater than the combined biasing force of the bowed leaf springs 65 and 66 of the overcenter spring means 50 and 51 so that the bowed leaf spring 106 will cause the plunger 70 to be moved from its first position, as shown in FIG. 2, towards its second position as shown in FIG. 3, when the plunger 70 is not held upwardly in its first position.

The plunger 70 is adapted to be moved upwardly from its second position, as shown in FIG. 3, towards its first position, as shown in FIG. 2, when engaged by an annular collar 110 of the centrifugal governor mechanism 14. The centrifugal governor mechanism 44 is carried by the output shaft 13 of the electric motor 10 and could be of any suitable or conventional construction. Preferably, it is of the type having an overcenter spring means 112 for moving the collar 110 with a snap action from a first position, as shown by the solid lines in FIG. 1, when the motor 10 is not operating or at standstill and a second position, as shown by the dotted lines in FIG. 1, when the motor 10 and output shaft 13 have attained a predetermined speed. Since the centrifugal governor mechanism 14 does not per se form a part of the present invention, it will not be described in detail.

The collar 110 is slidably supported on the output shaft 13 and has a radially extending flange 115 at one end provided with an annular peripheral surface 116. The collar 110 functions to engage the plunger 70 when the motor is being de-energized to cause the plunger 70 to be moved from its second position, as shown in FIG. 3, toward its first position, as shown in FIG. 2. To this end, the plunger 70 at its lower end has an elongated boot portion 120. The boot portion has an elongated bottom surface 121 extending axially of the output shaft 13 and which is adapted to ride on the annular peripheral surface 116 of the collar 110 when the motor 10 is being deenergized or at standstill. The boot portion 120 also has a tapered rearward section 122 which faces towards the governor mechanism 14. The taper is linear and progressively increases radially outwardly of the output shaft 13 from its forward end towards its rearward end.

Operation of the motor 10 for the clothes dryer will be described with reference to the schematic wiring diagram shown in FIG. 6. The wiring diagram includes a manual switch 130 for controlling energization and de-energization of the motor 10, the switch assembly 10, the main windings 22 of the motor, start windings 24 of the motor, thermal overload protector 132, and the electric heater 48 for the dryer (not shown).

When the electric motor 10 is de-energized the collar 110 engages the boot portion 120 of the plunger 70 to hold the same in its first position, as shown in FIG. 2. When in its first position, the overcenter spring means 50 and 51 bias the mobile contacts 52 and 53 into engagement with the stationary terminal 46 and out of engagement with the stationary terminal 45, respectively. When the operator desires to operate the dryer he will close the manual switch 130. The closure of the switch 130 will complete a circuit from a three wire, AC power line $L_1^-$ via wire 140, stationary terminal 41, wire 141, thermal overload protector 132, wire 143, main winding 22, wire 144, stationary terminal 42, wire 146, now closed switch 130, wire 147, to parallel power line $L_2$. A circuit is also completed from wire 143, start windings 24, wire 148, stationary terminal 46, mobile contact 52, overcenter spring means 50, stationary terminal 42, wire 146, now closed switch 130, wire 147, to parallel power line $L_2$. The completion of these circuits energizes both the main and start windings of the electric motor 10.

When the motor 10 reached a predetermined speed, the snap acting, centrifugal governor mechanism 14 will rapidly shift the collar 110 from its position shown by the solid lines in FIG. 1 to its position shown by the dotted lines in FIG. 1. Movement of the collar 110 to its dotted line position allows the bowed leaf spring 106 to move the plunger 70 from its first position as shown in FIG. 2, towards its second position, as shown in FIG. 3. Movement of the plunger 70 towards its second position will cause the overcenter springs 50 and 51 to move upwardly with a snap action until they engage the stationary terminals 47 and 45, as shown in FIG. 3. When the mobile contact 52 disengages the terminal 46 and engages the terminal 47 it breaks the hereinbefore described circuits for the main and start windings 22 and 24, but completes another circuit for the main windings 22 from the stationary terminal 42, overcenter spring means 50 mobile contact 52, stationary terminal 47, wire 150 to parallel power line $L_2$ to maintain the main windings 22 energized. Movement of the mobile contact 53 of the overcenter spring means 51 into engagement with its associated stationary terminal 45 completes a circuit for the heater 48 of the dryer. This circuit is from wire 140, stationary terminal 45, mobile contact 53, overcenter spring means 51, stationary terminal 40, wire 152, heater 48, to parallel power line $L_2$.

When the operator no longer desires dryer operation, he will move the manual switch to its open position. This breaks the hereinbefore described circuit for the main windings 22 of the motor 10 and causes the motor to be de-energized. As the motor 10 slows down, the snap acting, overcenter centrifugal governor mechanism 14 will cause the collar 110 to be rapidly shifted toward the right from its dotted line position towards its solid line position, as shown in FIG. 1. As the collar 110 is shifted toward the right it will engage the tapered section 122 on the boot portion 120 of the plunger 70 and cause the same to be cammed upwardly and thereafter ride on the underside 121 of the boot portion 120. The plunger 70 as it is cammed upwardly is moved from its second position towards its first position in which it effects movement of the overcenter spring means 50 and 51 to their position shown in FIG. 2. When the overcenter springs 50 and 51 are in this position, the mobile contact 52 engages the stationary terminal 46, and the mobile contact 53 is disengaged from the stationary terminal 45. This de-energizes the heater 48 of the dryer and positions the switch assembly 10 to initiate starting operation of the dryer the next time the manual switch 130 is moved to its closed position.

It should be noted that an important aspect of the present invention is the provision of the boot portion 120 on the plunger 70. The boot portion 120 allows the plunger 70 of the switch assembly 10 to be actuated directly by the collar 110 and in a manner such that there is no spring force exerted by the centrifugal governor mechanism 14 which acts in concert with the spring forces of the snap acting switch assembly 10. Hence, the snap acting overcenter springs 50 and 51 can be accurately designed to have contact pressures within a predetermined range. Moreover, the provision of the boot portion 120 eliminates the need for the collar 110 of the centrifugal governor mechanism 14 to be accurately positioned with respect to the plunger 70. This is because it makes no difference whether the collar 110, when in a standstill position, engages the rearward end of the boot portion 120 of the plunger 70 or engages it further towards it forward end, as long as the travel of the collar 110 when in its second or run position is disengaged from the plunger 70 to allow it to be moved downwardly by the bowed leaf spring. Thus, with the above construction and arrangement, the centrifugal governor mechanism 14 can be readily assembled to the output shaft 13 of the electric motor 12 without the need to accurately calibrate its position relative to the plunger 70 of the switch assembly 10. Also, since there is no intermediate actuating means between the collar 110 and the plunger 70 of the switch assembly 10, calibration of such actuating means has been totally eliminated.

Additionally, it should be noted that the construction and arrangement of the overcenter springs 50 and 51 of the switch assembly 10 is such that as the mobile contacts and stationary terminals wear during the life of the dryer, the contact pressures exerted by the overcenter springs 50 and 51 increases. This is because as the mobile contact surfaces 52 and 53 wear, the extent of the bow of the leaf springs will be increased, not decreased, and hence, will cause the mobile contacts 52 and 53 to engage their respective stationary terminals with even a greater spring force. This insures that good electrical conductivity between the overcenter springs 50 and 51 and the adjacent stationary terminals takes place throughout the life of the switch assembly 10.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. In combination, a dynamoelectric machine having first and second windings and a rotatable output shaft, a speed responsive governor mechanism carried by said machine and including a collar which is shiftable axially relative to said output shaft between a first position when the output shaft is not being rotated and a second position when the output shaft reaches a predetermined speed of rotation, and a switch assembly carried by the machine and operatively associated with the collar for controlling energization and de-energization of said windings, said switch assembly including a housing, switch means including a movable switch contact, and actuator supported for linear movement relative to said housing and radially of said output shaft and operatively connected with said movable switch contact for moving the latter, said actuator being movable between a first position in which said switch contact effects energization of both of said first and second windings and a second position in which the movable switch contact effects energization of only said first winding, biasing means for biasing said actuator toward its second position, said actuator having an elongated boot portion disposed externally of said housing and extending axially of said shaft, said collar when in its first position having its periphery in engagement with said boot portion to hold the actuator in its first position in opposition to the biasing force of said biasing means and being disengageable from the boot portion when in its second position to allow said biasing means to move said actuator towards its second position.

2. In combination, a dynamoelectric machine having run and start windings and a rotatable output shaft, a speed responsive governor mechanism carried by said output shaft and including a collar which is shiftable axially relative to the output shaft between a first position when the output shaft is not being rotated and a second position when the output shaft reaches a predetermined speed, and a switch assembly carried by the machine and operatively associated with the collar for controlling energization and de-energization of said start winding, said switch assembly including a housing, switch means including a movable switch contact, an actuator slidably supported within the housing and linearly movable relative to the housing and radially of said output shaft, said actuator being operatively connected with said switch contact for moving the same, said actuator being movable between a first position in which a switch contact effects energization of both said start and run windings and a second position in which a switch contact effects energization of only said run windings, spring means for biasing said actuator toward its second position, said actuator having an elongated boot portion disposed externally of said housing and extending axially of said output shaft, said collar when in its first position slidably engaging the boot portion to hold the actuator in its first position in opposition to the biasing force of said spring means and being disengageable from the boot portion when moved toward its second position to allow the spring means to move the actuator toward its second position, said boot portion being tapered at its end adjacent said collar and said collar being engageable with said tapered section upon being returned toward its first position to cam said actuator from its second position towards its first position and then riding on the underside of said boot portion when approaching its first position.

3. In combination, a dynamoelectric machine having start and run windings and a rotatable output shaft, a speed responsive governor mechanism carried by said output shaft and including a collar which is shiftable axially relative to said output shaft between a first position when the output shaft is not being rotated and a second position when the output reaches a predetermined speed, and a switch assembly carried by the machine and operatively associated with the collar for controlling energization and de-energization of said windings, said switch assembly including a housing defining an enclosed chamber having a side wall portion provided with a non-circular opening therethrough, a plurality of stationary terminals carried by said housing which are adapted to be electrically connected with a power source and the run and start windings of the dynamoelectric machine, snap acting overcenter spring means having one end secured to one of the stationary terminals and its other end disposed between two other spaced stationary terminals, a plastic actuator having a non-circular portion intermediate its ends which is disposed within and shaped complementary to the non-circular opening in the side wall of the housing and a radially extending flange which is engageable with the side wall portion of the housing around the opening, said actuator also including a stem portion disposed interiorly of the housing and having a radially extending recess therein, said overcenter spring means comprising a pair of laterally spaced arms integral with each other at their opposite ends and a pair of bowed portions integral with the arms at their ends and with their other end disposed within the recess of the stem portion of the actuator, said actuator being movable between the first position in which said overcenter spring means engages the stationary terminal to effect energization of both the start and run windings of the dynamoelectric machine and a second position in which said overcenter spring means engages another of said stationary terminals to effect energization of only said run windings of the dynamoelectric machine, spring means engageable with a wall portion of the housing and said stem portion of the actuator for biasing said actuator towards its second position, said flange on said actuator engaging the side wall of the housing when in its second position, said overcenter spring means causing said contact to be moved into engagement with the terminals via a snap action when the actuator moves the bowed leaf spring portions past the plane of the arms of the overcenter spring means, said actuator having an elongated boot portion extending axially of said shaft and disposed externally of said housing, said boot portion riding on an annular peripheral surface of said collar and said collar holding the actuator in its first position in opposition to the biasing force of said spring means when the latter is in its first position, said boot portion including a tapered end adjacent the collar, said collar being disengageable from the boot portion when in its second position to allow said spring to move said overcenter spring means overcenter and into snap acting engagement with the other terminal, said collar being engageable with said tapered section of said boot portion upon being returned toward its first position to cam said actuator from its second position towards its first position and then riding on the underside of said boot portion when approaching its first position.

* * * * *